United States Patent [19]
Bennett

[11] 3,781,513
[45] Dec. 25, 1973

[54] FUSION BRAID WELD

[75] Inventor: Moreland P. Bennett, Hickory, N.C.

[73] Assignee: General Electric Company

[22] Filed: Jan. 2, 1973

[21] Appl. No.: 320,114

[52] U.S. Cl. ............................................. 219/137
[51] Int. Cl. .............................................. B23k 9/00
[58] Field of Search .................... 219/118, 129, 130, 219/137, 136

[56] References Cited
UNITED STATES PATENTS
| | | | |
|---|---|---|---|
| 3,648,014 | 3/1972 | Bennett | 219/118 |
| 3,368,059 | 2/1968 | Scott et al | 219/118 |
| 3,566,008 | 2/1971 | Ettlinger | 219/118 X |
| 3,544,761 | 12/1970 | Rosenberg | 219/118 X |

Primary Examiner—C. L. Albritton
Attorney—Francis X. Doyle et al.

[57] ABSTRACT

Means for joining braided copper leads or terminals to aluminum bus bars or tap straps. The means provides for clamping the braided copper member to the aluminum, preferably by means of a copper heat sink. Then the edges or overlapped areas of the copper and aluminum are fusion welded by a gas metal arc welding process with automatic aluminum wire feed. In a modified version a copper alloy wire is hand fed to the joint together with the aluminum filler wire from the welding gun.

5 Claims, 4 Drawing Figures

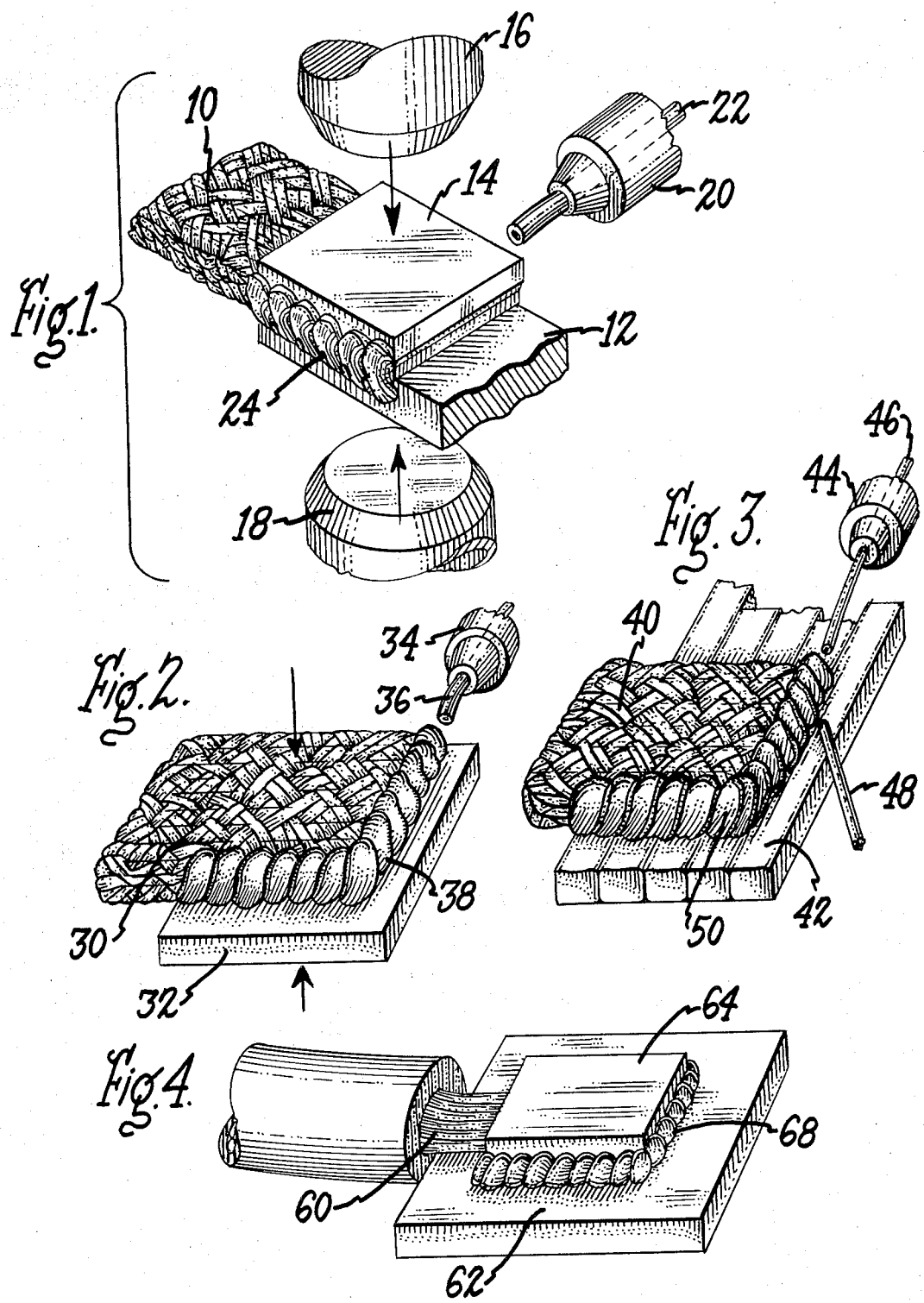

3,781,513

FUSION BRAID WELD

BACKGROUND OF THE INVENTION

This invention relates to joints between copper braid and aluminum, and, more particularly, to a method of joining a braided copper member to an aluminum member, and to the copper - aluminum joint formed by such process.

The problems inherent in forming a joint between copper and aluminum are well known to those skilled in this art. Copper, for example, does not form a good eutectic bond with aluminum. The joints usually formed are unsatifactory, particularly for electrical applications, since such joints have high electrical resistance. Further, in most prior methods, the joints so formed have been marked by very weak mechanical properties.

Recently, in the electrical apparatus field, the use of aluminum strip windings to form coils has become widely used throughout the industry. This has led to a requirement for finding a more advantageous way of joining copper to aluminum. This has become necessary due to the use of leads and crossovers of copper that are often considered desirable, even when using aluminum strip windings.

It has recently been disclosed in U. S. Pat. No. 3,648,014 in the name of the present inventor, that copper braid can be joined to aluminum by using a resistance welding machine and melting the aluminum under pressure which extrudes the aluminum between the strands of the copper braid. While this joint is excellent from a mechanical and electrical view, it does not lend itself to joints between large aluminum members, such as bus bars or multiple tap straps, and large copper braided members. As will be understood, such large copper and aluminum members are found in large size transformers and regulators. Also, as will be understood, it is necessary that any joint to be formed, be such that it can be readily formed on the coils of the electrical apparatus while the apparatus is being manufactured on an assembly or production line.

It has recently been discovered that a secure mechanical and electrical joint can be made by fusion welding techniques. In such process it is required that the copper member be held firmly against the aluminum member during the fusion welding. Further, it has been found desirable that a heat sink be provided during the welding process to prevent excessive melting of the aluminum.

It is therefore, one object of this invention to provide a novel method of welding copper braid to aluminum.

A further object of this invention is to provide a novel fusion welded joint between copper braid and aluminum.

Yet another object of this invention is to provide a novel welded joint between a copper braid and one or more aluminum members.

A still further object of this invention is to provide a novel method of fusion welding a copper braid to an aluminum member which method can be readily performed on a production line.

BRIEF SUMMARY OF THE INVENTION

Briefly, in one form, this invention comprises a method of joining a copper braid to a large aluminum bus bar. The copper braid is tin plated and is in the form of a plurality of small diameter wires. A fusion welding process is used in the form of a gas metal arc with automatic aluminum wire feed. While maintaining the arc and melting the aluminum wire, the small tin plated copper wires melt and become a copper alloy. This alloy alloys with the aluminum wire and the aluminum base material to form a new alloy of tin, copper and aluminum. The welding is performed along the edges of the copper braid and the aluminum member flowing the molten alloy along the edge of the braid. Pressure is applied to hold the copper braid and the aluminum members together to insure a secure joint. In a modified form, a copper alloy wire is hand fed to the joint together with the automatic feeding of the aluminum wire.

The invention which is sought to be protected will be particularly pointed out and distinctly claimed in the claims appended hereto. However, it is believed that this invention and the manner in which its objects and advantages are obtained, as well as other objects and advantages thereof, will be better understood by reference to the following detailed description of the preferred embodiments, especially when considered in the light of the accompanying drawing.

BRIEF DESCRIPTION OF THE DRAWING

FIG. 1 is a perspective view of the preferred method of this invention of joining a copper braid member to an aluminum member, such as a bus bar;

FIG. 2 is a perspective view of a slightly different form of this invention;

FIG. 3 is a perspective view showing the invention applied to a number of aluminum members; and using a copper alloy wire; and FIG. 4 is a perspective view of the invention showing a copper braided wire attached to an aluminum terminal.

DESCRIPTION OF PREFERRED EMBODIMENTS

In accordance with this invention, a copper braided member, formed of small copper wire is tin plated and bonded to an aluminum member by a fusion welding process. The copper braid is held firmly against the aluminum member while a gas metal arc welding process, using automatic aluminum wire feed is used to bond the members together. The drawing shows the present preferred embodiments of forming such joint. Reference will now be made to such drawing, for a more complete description of the method and joint of this invention.

Referring first to FIG. 1, there is shown a copper braid member 10, formed of a plurality of fine copper wires. In the preferred form of this invention the copper wires are in the order of 0.003 to 0.030 inches in diameter, and the copper is tin plated. The copper braid may be a crossover between aluminum windings, or it may be the connection between an aluminum winding and an aluminum bus bar. One end of the copper braid 10 is placed in overlapping relation with a portion of an aluminum member 12, which may be for example, the end of an aluminum strip winding. An aluminum clamp plate 14 is shown placed over the end of the copper braid 10 forming a sandwich with the copper 10 between aluminum members 12 and 14. The assembly is clamped between copper heat sinks shown as members 16 and 18. A gas metal arc welding gun 20, having an automatic feed of aluminum wire 22 is used to provide a fusion weld 24 along the overlapped edges of the braid 10, the aluminum 12 and the aluminum clamp plate 14. The fusion weld 24 is formed of the alloy of the copper braid with the tin plate and the melted aluminum wire and the aluminum base material. As will be understood, while maintaining the arc and melting the aluminum wire, the small tin plated copper braided wires of copper braid 10 melt forming a copper alloy. This copper alloy (bronze) alloys with the molten aluminum wire 22, and the aluminum of the members 12 and 14, to form a new alloy of tin, copper, and aluminum, a form of aluminum bronze. This alloy forms the fusion weld 24, securely joining member 10, 12 and 14 together.

FIG. 2 shows a copper braid member 30 in overlapped relation with an aluminum member 32. Pressure indicated by the arrows, is provided by a copper heat sink (not shown) while the welding gun 34 with the aluminum wire 36 makes a fusion weld 38 along the overlapped edges of the copper braid 30 and the aluminum 32. Obviously, weld 38 is formed of the same alloy as weld 24.

In FIG. 3 a further embodiment is shown, in which a copper braid 40 is welded to a plurality of aluminum members 42, such as aluminum wires. A welding gun 44 having aluminum wire 46 automatically fed therethrough deposits the fusion weld 50 composed of an alloy of copper, tin and aluminum. In this embodiment, a copper alloy wire 48 is shown as being hand fed directly to the weld joint. In this embodiment the copper alloy is an aluminum bronze which enriches the melt providing an improved transition between the copper and the aluminum.

FIG. 4 shows the invention applied to a copper braided wire or cable 60 which is welded to an aluminum member 62, using an aluminum clamping plate 64 with the fusion weld 68 firmly welding the members together.

From the above description, it will be apparent that this invention sets forth a novel method of welding a copper braided member to one or more aluminum members. While the present preferred embodiments of this invention have been set forth in some detail it will be apparent that this invention is not limited thereto, and that various changes may be made without departing from the spirit and scope of the invention, especially as it is defined in the appended claims.

What is claimed as new and which it is desired to secure by letters patent of the United States is:

1. A method of joining a copper braid to an aluminum member comprising the steps of;
   a. providing a copper braided member,
   b. providing an aluminum member,
   c. placing a portion of said copper braided member in overlapped relation with said aluminum member,
   d. applying pressure to hold said members in contact with each other,
   e. using a gas metal arc welding gun with an automatic feed of aluminum wire to form a fusion weld along the overlapped edges of said copper braided member and said aluminum member.

2. A method of joining a copper braid to an aluminum member as set forth in claim 1, in which an aluminum clamping plate is placed over said copper braided member to form a sandwich with said copper braided member between said aluminum member and said aluminum clamping plate.

3. A method of joining a copper braid to an aluminum member as set forth in claim 1, in which a copper alloy wire is hand fed to the weld joint along said overlapped edges.

4. A method of joining a copper braid to an aluminum member as set forth in claim 1, in which said copper braided member is tin plated.

5. A welded joint between a copper braided member and an aluminum member in which overlapped edges of the members are joined by a fusion weld formed of an alloy of copper, tin, and aluminum.

* * * * *